United States Patent [19]

Berg, deceased et al.

[11] 4,138,375
[45] Feb. 6, 1979

[54] PROCESS FOR THE PRODUCTION OF PULVERULENT, POURABLE ELASTOMER-FILLER MIXTURES OPTIONALLY CONTAINING PLASTICIZER OIL

[75] Inventors: Gerhard Berg, deceased, late of Marl, Fed. Rep. of Germany, by Ingrid Berg, legal representative; Karl-Heinz Nordsiek, Marl, Fed. Rep. of Germany

[73] Assignee: Chemische Werke Huels Aktiengesellschaft, Marl, Fed. Rep. of Germany

[21] Appl. No.: 855,868

[22] Filed: Nov. 30, 1977

[30] Foreign Application Priority Data

Dec. 1, 1976 [DE] Fed. Rep. of Germany ....... 2654358

[51] Int. Cl.$^2$ .............................................. C08L 1/28
[52] U.S. Cl. .............................. 260/17 R; 260/23.7 A; 260/29.7 W; 260/42.47
[58] Field of Search .......... 260/17 R, 23.7 A, 29.7 W, 260/42.47

[56] References Cited

U.S. PATENT DOCUMENTS

| | | | |
|---|---|---|---|
| 3,285,869 | 11/1966 | Ronay et al. | 260/23.7 A |
| 3,846,365 | 11/1974 | Berg et al. | 260/29.7 N |
| 3,895,035 | 7/1975 | Berg et al. | 260/34.2 |
| 3,920,604 | 11/1975 | Berg et al. | 260/34.2 |
| 3,922,240 | 11/1975 | Berg et al. | 260/34.2 |
| 3,929,707 | 12/1975 | Berg et al. | 260/34.2 |
| 3,945,978 | 3/1976 | Berg et al. | 260/34.2 |

*Primary Examiner*—M. J. Welsh
*Attorney, Agent, or Firm*—Millen & White

[57] ABSTRACT

Pourable elastomer-filler mixtures, optionally containing plasticizer oil, are prepared by an improved process, the process comprising mixing an aqueous emulsion of an elastomer solution with an aqueous dispersion of a filler(s); introducing this mixture into water containing a precipitant(s); precipitating the elastomer-filler mixture while simultaneously removing the elastomer solvent by distillation; separating the thus-precipitated elastomer-filler mixture from the water; and drying the elastomer mixture under constant agitation; and the improvement comprising:

initially emulsifying the elastomer solution in water in the presence of a combination of:
 (a) 0.01 – 1.0% by weight of an anionic emulsifier, based on the weight of the elastomer solution;
 (b) 0.001 – 0.1% by weight of a nonionic protective colloid, based on the weight of the elastomer solution; and
 (c) 0.001 – 0.1% by weight of a nonionic protective colloid, based on the weight of the elastomer solution;

combining the thus-stabilized solution-emulsion with an aqueous dispersion of filler(s), prepared at a pH of > 7 in the presence of 0.01 – 5% by weight, based on the amount of filler, of one or more tensides, which when combined with the compounds listed under (a) through (c) do not result in a reduction of the surface activity of either the components a-c or the tensides, to form a homogeneous mixture exhibiting storage stability and agitation stability; and introducing this mixture into a precipitating bath, the pH of which is adjusted to a value of 1.0 – 5.0 by addition of acids and/or metallic salts subject to acidic hydrolysis in water, the temperature of this precipitating bath lying above the azeotropic boiling point of solvent and water, and this precipitating bath containing, based on the total elastomer content, such a quantity of sodium silicate that the latter forms, at the pH values of the precipitating bath, 0.001 – 20% by weight of colloidally dissolved silicic acid.

28 Claims, No Drawings

PROCESS FOR THE PRODUCTION OF PULVERULENT, POURABLE ELASTOMER-FILLER MIXTURES OPTIONALLY CONTAINING PLASTICIZER OIL

BACKGROUND OF THE INVENTION

The present invention relates to a process for the preparation of pulverulent, pourable elastomer-filler mixtures optionally containing plasticizer oil. The process conventionally involves mixing an aqueous emulsion of an elastomer solution with an aqueous dispersion of fillers; introducing this mixture into water containing precipitants; precipitating the elastomer-filler mixture while simultaneously removing the elastomer solvent by distillation; separating the thus-precipitated elastomer-filler mixture from the water; and drying the elastomer mixture under constant agitation.

A large number of publications have been issued and numerous patent applications have been filed over more than a decade, regarding the purposes and objectives of using pulverulent elastomers and possible methods for the production thereof, clearly indicating the great popularity of pulverulent elastomers for the modern rubber processing industry.

This ever-increasing interest in pulverulent elastomers can be readily understood by a consideration of the present state of the art of processing technology in the rubber industry. Presently, in this industry, elastomer mixtures are prepared in a discontinuous mode of operation. The principal reason for this is the physical condition of the rubber raw material, which is in bale form. The comminution of the bale and its intimate mixing with fillers, mineral oil plasticizers and auxiliary vulcanizing agents take place on rolls or in internal mixers. The operation of these units requires high amounts of energy. During the agitation of the highly viscous material, this energy is rapidly converted into heat. To avoid deterioration in quality by molecular changes or premature vulcanization, the mixture is produced in several process stages. Between these stages, the mixture is generally placed in storage. The internal mixers or rolls are followed by extruder pelletizers or extruder roller dies. This discontinuous method of processing requires a high expenditure in time, energy, and personnel.

Thus, the present state of the rubber processing art is highly unsatisfactory. This situation can only be remedied by a completely novel processing technology. Consequently, in recent years, discussions of alternative techniques have centered around the use of pourable elastomer powders since without a doubt raw materials in this physical form greatly reduce the expenditures in technology, personnel, and energy for the rubber industry. Moreover, they will provide the conditions for a one-stage and automated processing operation, while eliminating the heretofore customary heavy machinery. The development of such pourable powders creates the possibility of processing elastomer mixtures in the same way as synthetic resin powders.

At the same time, it is required that the new suitable product concept optimally meet the aforementioned requirements and overcome the above-described difficulties. In addition, there is a need for making available maximally economical manufacturing processes with the elimination of the use of undesired foreign substances. As a result, the development has perforce led to pulverulent premixes of elastomers and fillers. Because of economical considerations regarding manufacturing and processing, oil-free blends have evolved as the preferred item.

Most recently, several methods have been discovered and described for the manufacture of pulverulent, pourable elastomer-filler mixtures, preferably elastomer-carbon black mixtures based on all-purpose rubbers. See German Patent Applications P 21 35 266 (U.S. Pat. No. 3,846,365); P 22 14 121 (U.S. Pat. No. 3,895,035); P 22 60 340 (U.S. Pat. No. 3,920,604); P 23 24 009 (U.S. Pat. No. 3,945,978); P 23 25 550 (U.S. Pat. No. 3,922,240); P 23 32 796 (U.S. Pat. No. 3,929,707); and, P 24 39 237 (U.S. Pat. No. 4,073,755), whose disclosures are incorporated by reference.

Essential features of the processes described in these prior art publications comprise the utilization of specific, surface-active compounds in combination with quite specific process steps. Because of the presence of the active fillers, which are necessary anyway in the subsequent processing, surface structures are obtained which impart an excellent shelf life to the pourable powders, including favorable transportation properties. The dominant advantage, however, lies in the optimum preliminary dispersion of the fillers, offering extremely favorable conditions for the development of low-energy, continuous and fully automatic processing operations.

The conventional processes for the preparation of pulverulent elastomer mixtures comprise the following features in accordance with the cited state of the art:

1. The solutions of the above-mentioned elastomers are emulsified in water with the aid of cationic or nonionic, nitrogen-containing surfactants; mixed with aqueous dispersions or fillers, preferably carbon blacks; and the stable mixtures from the aqueous emulsions of the rubber solutions and the fillers are subjected to a one-stage precipitating process.

2. The summary of the aforedescribed processes can also be expanded to include anionic surfactants; however, then a three-stage precipitation technique must be employed while maintaining certain process characteristics (see German Patent Application No. P 24 39 237).

The heretofore described processes accordingly require either relatively expensive chemicals, especially costly surfactants such as, for example, quaternary ammonium salts or alkyl amine oxyalkylates (condensation products of alkyl amines with ethylene oxide), in relatively large quantities, or an expensive, multistage precipitation technique. Since, as has been explained above, the primary objective in the use of pulverulent elastomers is an increase of economy in the area of rubber processing, a basic prerequisite for the success of such efforts is the inexpensive production of elastomers in powder form. Thus, there remains a genuine need for an improved process for production of powdered elastomer-filler mixtures both from economic and technological viewpoints.

SUMMARY OF THE INVENTION

Accordingly, it is an object of this invention to provide a novel, simple, and economical process for the production of pulverulent, pourable elastomer-filler mixtures which optionally contain plasticizer oil, while at the same time preserving the advantages of the known methods, overcoming the above-discussed disadvantages, and optionally still further improving the processability of the thus-obtained powdered products.

Upon further study of the specification and appended claims, further objects and advantages of this invention will become apparent to those skilled in the art.

These objects have now been attained by the present invention by providing an improvement in a process for the production of pulverulent, pourable elastomer-filler mixtures optionally containing plasticizer oil, the process comprising mixing an aqueous emulsion of an elastomer solution with an aqueous dispersion of a filler(s); introducing this mixture into water containing a precipitant(s); precipitating the elastomer-filler mixture while simultaneously removing the elastomer solvent by distillation; separating the thus-precipitated elastomer-filler mixture from the water; and drying the elastomer mixture under constant agitation; and the improvement comprising:

initially emulsifying the elastomer solution in water in the presence of a combination of:
 (a) 0.01–1.0% by weight of an anionic emulsifier, based on the weight of the elastomer solution;
 (b) 0.001–0.1% by weight of an ionic protective colloid, based on the weight of the elastomer solution; and
 (c) 0.001–0.1% by weight of a nonionic protective colloid, based on the weight of the elastomer solution;

combining the thus-stabilized solution-emulsion with an aqueous dispersion of filler(s), prepared at a pH of > 7 in the presence of 0.01–5% by weight, based on the amount of filler, of one or more tensides, which when combined with the compounds listed under (a) through (c) do not result in a reduction of the surface activity of either the components a-c or the tensides, to form a homogeneous mixture exhibiting storage stability and agitation stability; and introducing this mixture into a precipitating bath, the pH of which is adjusted to a value of 1.0–5.0 by addition of acids and/or metallic salts subject to acidic hydrolysis in water, the temperature of this precipitating bath lying above the azeotropic boiling point of solvent and water, and this precipitating bath containing, based on the total elastomer content, such a quantity of sodium silicate that the latter forms, at the pH values of the precipitating bath, 0.001–20% by weight of colloidally dissolved silicic acid.

DETAILED DISCUSSION

Elastomer solutions suitable for use in the process of this invention are preferably those obtained during the solution polymerization of synthetic elastomers according to the methods of the prior art, as disclosed in the foregoing publications which have been incorporated by reference herein, for example polybutadienes, polyisoprene, copolymers of butadiene and sytrene, ethylene-propylene copolymers (EPM), ethylene-propylene-diene terpolymers (EPDM), and polyalkenamers produced by the ring-opening polymerization of cycloolefins. As is known, organometallic compounds, such as, for example Ziegler, lithium, or alfin catalysts, are utilized in the preparation of these elastomers, being selected in dependence on the specific monomers and properties of the final polymers.

Suitable solvents include aliphatic hydrocarbons, such as, for example, pentane, hexane, heptane, or aromatic hydrocarbons, such as, for example, benzene or toluene. Those polymers are preferred which have been produced in an aliphatic solvent and which can be directly employed in the form of the solution obtained after the short-stopping of the polymerization and subsequent stabilization.

However, the elastomer can also be placed into an emulsifiable state by redissolution. Especially preferred in this connection are polybutadienes and copolymers of butadiene with styrene in the form of their polymers produced in aliphatic hydrocarbons having a vinyl group content of 10–70%, preferably 20–60%. The "vinyl group content" of a homo- or copolymer refers to the percentage of all —$CH=CH_2$ end groups in the homo- or copolymer, based on the sum total of all double bonds, as determined, for example, by IR spectroscopy (absorption at 910 $cm^{-1}$).

It is also possible in accordance with the process of this invention to prepare pulverulent elastomer mixtures which contain not only a single elastomer, but rather mixtures of two or more different elastomers, for example a mixture of polybutadienes with differing vinyl group proportions and polyisoprenes. For this purpose, the elastomer solutions or, more advantageously, the aqueous emulsions of the elastomer solutions are mixed together and subsequently treated according to this invention to form filler-containing, pulverulent elastomer mixtures.

Suitable anionic emulsifiers (component [a] of the important combination of this invention) include those which form, with the acid-hydrolyzing metallic salts optionally used in the precipitating bath, compounds that are insoluble or sparingly soluble in water and are usable as adhesion inhibitors for the coagulated powder particles.

Suitable such surfactants include the alkali metal salts of saturated or unsaturated $C_{12}$- to $C_{18}$-fatty acids or mixtures thereof, as well as the alkali metal salts of aromatic sulfonic acids, such as dinaphthylmethanesulfonic acids.

Suitable ionic protective colloids (component [b] of the important combination of this invention) include above all sodium polyacrylates having weight average molecular weights of 100,000–2,000,000, preferably 250,000–1,500,000 as measured by viscosity measurements.

Suitable nonionic protective colloids include cellulose derivatives, such as, for example, methylcellulose, carboxymethylcellulose, and "Tyloses".

The anionic emulsifiers are preferably utilized in amounts of 0.01–1.0% by weight, preferably 0.05–0.5% by weight, based on the weight of the elastomer solution. The ionic and the nonionic protective colloids are employed in amounts of 0.001–0.1% by weight, preferably 0.004–0.05% by weight, based on the weight of the elastomer solution. All three components [a–c] are preferably employed as aqueous solutions.

The weight ratios of anionic emulsifier to protective colloids thus range from 500 : 1 to 1 : 20, but are preferably between 50 : 1 and 3 : 1. The choice of which anionic emulsifier is most suitable in combination with a particular protective colloid is dependent on many factors (e.g., type of elastomer, type of filler, filler activity, elastomer solvent etc.) and can always be determined by a few preliminary conventional orientation experiemnts. As is conventional, the weight ratio of the amount of elastomer solution to that of water in the emulsion is usually 10:1–1:4, preferably 2:1–1:2. Except for the foregoing components [a–c], the choice of elastomer solution emulsion conditions is conventional and can be easily determined by skilled workers with reference to the publications incorporated by reference herein.

Preferred fillers are the carbon blacks of all activity stages customary for use in the rubber industry, such as, for example, SAF [super abrasion furnace], ISAF [intermediate super abrasion furnace], HAF [high abrasion furnace] blacks, including their modifications, FEF [fast extruding furnace], GPF [general purpose furnace], APF [all-purpose furnace], SRF [semireinforcing furnace], MT [medium thermal] blacks. However, suitable fillers also include mineral substances, such as, for example, highly active silicic acid, kaolin, ground slate, etc. (see S. Boström, Kautschuk-Handbuch, 2. Band (1960), p. 240-274).

The amount of carbon black to be used ranges from 20% by weight based on the amount of elastomer up to 400 parts by weight per 100 parts by weight of elastomer, preferably 40% by weight based on the amount of elastomer to 110 parts by weight per 100 parts by weight of elastomer. The amount of mineral substances ranges between 20% by weight based on the amount of elastomer and 500 parts by weight per 100 parts by weight of elastomer, preferably between 30% by weight based on the amount of elastomer and 150 parts by weight per 100 parts by weight of elastomer. As is coventional, the weight ratio of the amount of filler to that of water in the dispersion is usually 1:100-20:100, preferably 4:100-10:100.

It is also possible to use combinations of carbon blacks with the light-colored mineral fillers within the limits indicated above for the individual components, i.e., the total amount of such fillers can range from 20% weight% based on the amount of elastomer to 400 parts by weight per 100 parts by weight of elastomer, preferably from 40 weight% based on the amount of elastomer to 120 parts weight per 100 parts by weight of elastomer.

The aqueous filler dispersions are prepared at a pH value of > 7, preferably 9-12, in the presence of 0.01-5% by weight, preferably 0,5-3% by weight, based on the amount of filler, of one or several tensides which do not result in a reduction of the surface activity provided by the emulsifiers and/or protective colloids recited under (a) through (c). Suitable such tensides include the compounds useful as (a) through (c), or $C_{12-18}$-alkyl amine ethoxylates, or phenol ethoxylates.

Except for the foregoing, the choice of filler aqueous dispersion conditions is conventional and can be determined easily by skilled workers with reference to the publications incorporated by reference herein.

The method of combining the elastomer emulsion and the filler aqueous dispersion is fully conventional. See, for example, the foregoing publications which have been incorporated by reference herein.

When the optional plasticizer oils are to be incorporated, the conventional refinery products customary for this purpose are employed. These consist, depending on the purpose for which the vulcanizates will eventually be used, preferably of aromatic, naphthenic, or paraffinic hydrocarbons. The amount of plasticizer oils to be utilized ranges between 1 and 100% by weight, preferbaly between 30 and 60% by weight, based on the amount of the elastomer. To produce a filler (e.g. carbon black)-elastomer mixture containing a plasticizer oil, conventional procedures can be used, e.g., simply combining the plasticizer oil with the elastomer-filler mixtures prepared according to this invention in a suitable mixer, e.g., a fluid mixer. The thus-obtained mixture is surprisingly still pulverulent and pourable.

After the combination of the elastomer and the filler, the resultant mixture is introduced into a precipitation bath. Suitable precipitants for the anionically stabilized mixtures of the aqueous emulsions of the elastomer solutions and the aqueous filler dispersions, as well as the sodium silicate discussed below, include, in addition to acids such as sulfuric acid, hydrochloric acid, nitric acid and phosphoric acid; metallic salts subject to acidic hydrolysis, e.g., the salts of the metals of Main Groups II and III, as well as Subgroups II and VIII of the Periodic Table of the Elements, for example magnesium chloride, zinc sulfate, iron chloride, iron sulfate, cobolt nitrate, nickel sulfate, but preferably water-soluble salts of aluminum, such as, for example, aluminum chloride and aluminum sulfate. Mixtures of such acids and salts can also be used. The amount of such precipitants ranges between 1 and 20% by weight, preferably between 2 and 10% by weight, based on the amount of the elastomer and is sufficient to adjust the pH of the precipitating bath prior to addition of the elastomer-filler mixture, to a value of 1.0-5.0.

The precipitating bath also contains from 0.001-20% by weight, preferably 0.5-10% by weight, based on the total amount of elastomer, of silicic acid, calculated as $SiO_2$. This silicic acid can be provided by addition of various ingredients such as sodium silicate. The silicic acid is in a colloidally dissolved form. Optionally, the silicic acid can be added to the elastomer/filler mixture prior to introduction of the mixture into the precipitation bath. A suitable sodium silicate is a sodium silicate solution having molar ratios of $Na_2O:SiO_2$ of 2:1-1:4. The amount of sodium silicate to be used is that sufficient to liberate the above-defined amounts of silicic acid in the precipitation bath. Typical amounts of sodium silicate are 0.003-35%, based on the amount of elastomer.

Moreover, the sodium silicate serves as an auxiliary agent for controlling the particle size during the coagulation of the batch, for avoiding foaming of the batch, and for improving the filtering capacity of the moist batch. After neutralization, when the coagulation is terminated, the sodium silicate also serves for the precipitation of intentionally small amounts of $SiO_2$ which is achieved by carrying out the process of this invention in accordance with the details disclosed herein.

The temperatures in the precipitating stage, under all pressure conditions, should be above the azeotropic boiling point of the elastomer solvents and water. Under normal pressure, the process is preferably carried out at between 60° and 100° C. Suitable pressure are from 0.5 to 2 atm. The temperatures can be achieved by direct introduction of steam into the precipitating bath. Under these conditions, the elastomer solvent is continuously removed by distillation without foam formation. The pulverulent elastomer-filler mixtures obtained in accordance with the conditions of the process of this invention in the precipitation stage have particle sizes of between 0.001 and 1 mm, especially between 0.01 and 0.8 mm, preferably between 0.02 and 0.3 mm. Those features of the preparation of the elastomer-filler powders which are not discussed herein, e.g., neutralization of the precipitating bath, separation of the water, drying, etc. are fully conventional and are disclosed for example in the foregoing publications incorporated by reference herein.

The process of the present invention therefore involves a combination of improvement measures, all critical to the process, by means of which it is possible in a surprisingly economical manner to prepare finely divided and chemically stable elastomer-filler mixtures having improved vulcanizate and processing properties.

The economical advantages are provided, on the one hand, by the fact that due to the use of specific combinations of anionic emulsifiers with ionic and nonionic protective colloids, substantially smaller amounts of surfactants are required than in the prior art processes. On the other hand, the anionic emulsifiers usable in accordance with this invention are relatively inexpensive and thus, in total, result in a considerable lowering of the production costs as compared with the previously proposed methods.

Beyond the aforementioned economic advantages, the process of the present invention also represents a significant technical advance in the art since it provides an improved product quality and a resultant improvement in the subsequent processing operation. For it has been discovered, surprisingly, that it is possible to produce, from the elastomer-filler mixtures (powder batches) prepared in accordance with this invention, vulcanizates having improved strengths, moduli, and elasticities as compared with the properties of vulcanizates produced using conventional mixtures. Furthermore, the extrusion characteristics of the pulverulent, pourable elastomer-filler mixtures prepared according to the process of this invention, in combination with all auxiliary agents required for vulcanization, are superior to those displayed by the prior-art mixtures. The extruded profiles display an excellent surface character and, in cross-section, neither bubbles nor fisheyes are observed.

It is also to be emphasized that the chemically inert behavior of the surfactants, which are critical to the process and remain in the product, has no influence on the aging and vulcanization properties of the powder batches, thereby causing fewer problems in the handling of the batches during storage and processing. Above all, the subsequent processing operation is considerably improved with respect to initial vulcanization and pre-gelling.

However, another technical advance in the art is derived in handling the elastomer-filler mixtures according to this invention during the individual process stages for the production thereof. Thus, it has been found — again surprisingly — that the aqueous mixtures of the dispersions of the elastomer solutions and the fillers exhibit mechanical stabilities heretofore unheard of. This has an advantageous effect when the mixtures are exposed to shear forces, which occur, for example, during agitation. This makes it possible to achieve higher throughputs in this process stage and — if necessary — also permits longer residence times. It is also significant that the process of this invention leads to considerable advantages with respect to environmental protection as compared with known methods for the production or pulverulent elastomer-filler mixtures. This is derived from the fact that the waste water discharged during the present process is considerably less loaded with electrolyte due to the capability of using water-soluble, acidically hydrolyzing metallic salts, with a simultaneous reduction of the amount of sulfuric acid used as the coagulate in the precipitating stage.

Finally, the process of this invention also affords a technical advantage during the exhausting of the solvents in the precipitation stage. This exhausting step can be surprisingly effected by the sole direct use of cheap steam for the heating of the aqueous precipitating bath without froth formation. This not only provides the opportunity to abandon the expensive practice of providing a jacket-type heating unit but also drastically increases the throughput in this process stage.

In summary, the process of this invention involves the following significant measures:

1. Replacement of the previously customary, expensive amine compounds by less expensive, anionic emulsifiers during the dispersion of the elastomer solutions;

2. Drastic reduction in the amounts of emulsifier used;

3. Combination of the anionic emulsifiers with ionic and nonionic protective colloids;

4. Processing of the elastomer-solution emulsion and the filler dispersion in a single-stage process, i.e. the entire amount of elastomer and the entire quantity of filler are simultaneously coagulated in a homogeneous, stable mixture;

5. After neutralization of the thus-coagulated batch liquor, precipitation of intentionally small amounts of $SiO_2$.

The advance in the art provided by these measures applies, as explained above, over a broad range of areas. Thus, the improvements, which are nothing less than astonishing, apply with equal importance to the fields of economy, process technology, utilization and processing techniques and waste water [environmental protection] considerations. For the first time, the rubber processor is offered pulverulent and pourable elastomer-filler mixtures which are sure to fulfill all economic prerequisites.

The total process in brief encompasses the following:

Elastomer solutions are dispersed in water in the presence of anionic substances in combination with ionic and nonionic protective colloids to form stable emulsions. Fillers, preferably carbon blacks, are likewise dispersed in water, namely in the presence of tensides which do not alter the surface energies of both dispersed systems. The two dispersed systems are combined, optionally even at this point with the addition of the above-mentioned quantity of sodium silicate solution. The thus-obtained mixture is very stable and has a good shelf life.

The stable and homogeneous mixtures are then coagulated into extremely finely divided elastomer-filler particles in a precipitating stage in the presence of the required amount of sodium silicate, insofar as this compound has not previously been added to the dispersions prior to or during their combination, and optionally in the presence of water-soluble metallic salts, in hot water adjusted to a pH of 1.0–5.0. After the precipitation of the elastomer-filler mixture, the pH of the precipitation bath is adjusted to pH 5–9, thereby precipitating the small amounts of $SiO_2$. After this neutralization and separation of the water, the moist batches are dried to a powder.

From the pulverulent elastomer-filler mixtures, vulcanizable finished elastomer mixtures can be conventionally prepared in a simple manner by admixing thereto, in modern fluid mixers, the conventional additives, such as additional fillers, plasticizer oils, resins, ozone-protection and anti-aging agents, as well as crosslinking agents. This mixing step is executed without the use of shear forces. The direct use of such finished pulverulent elastomer mixtures in the final stages of the conventional rubber processing operations, with the exclusion of heavy machinery having high energy requirements, has now been made possible in a surprisingly simple and economical fashion. Thus, the finished powder mixtures produced from the products of this invention can be fed directly into special extruders or automatic injection molding machines. The output and quality of the resultant tire treads, for example, correspond to the results obtained using solid elastomers as starting materials and employing the normal, multistage, expensive processing technique. The pulverulent elastomer mixtures of this invention have made it possible to utilize, in practice, elastomer processing operations which are equivalent to the methods used in synthetic resin processing.

However, even if the normal processing technique of the rubber-processing industry is used, the advantages attendant to the use of the pulverulent elastomer mixtures of this invention are considerable. Thus, it has been found that the production of vulcanizable finished elastomer mixtures, even with high proportions of active fillers, can be accomplished in a simple and particularly economical manner in conventional internal mixers. In this procedure, as compared with the heretofore customary, multistage mixing technique, the operating time in a single operating step has now been drastically reduced to from one-third to one-fourth of the usually necessary total mixing time, with the energy consumption being reduced to approximately the same extent. The ejection temperatures are usually only a few degrees above 100° C. Furthermore, it is possible to incorporate comparatively small proportions of other solid elastomers in the elastomer-filler mixtures of this invention.

To attain optimally short mixing cycles, special importance is to be attributed to the sequence of introducing the individual components in metered amounts into the internal mixer. Optimum results are observed by "upside down"-mixing, that means starting with the oil followed by addition of powder batch and chemicals. The feeding of all of the components can be effected fully automatically, as contrasted to the feeding procedure required with the use of solid rubber. In addition to the aforementioned extradordinary reduction of the mixing time, the possibility is afforded of also shortening the feeding time and thus enormously increasing the capacity of conventional, highly costly mixing plants.

Consequently, independent of the type of processing method, the use of the inexpensive, pulverulent elastomer-filler mixtures of this invention leads to extraordinary advantages from technical and economic viewpoints. The array of possible advantages extend from a drastic reduction of the mixing times with the use of conventional units, such as internal mixers and rolling mills, to the continuous conducting of the process without the use of heavy machinery.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

The elastomer employed is a polybutadiene, obtained by the adiabatic polymerization of butadiene in the presence of n-butyllithium in the form of a 13.6% by weight solution in hexane, the polybutadiene having the following analytical data:

| | |
|---|---:|
| Mooney viscosity (ML$_4$) | 80 |
| Defo | 1150/34 |
| Gel content | <2% |
| Content of trans-1,4 proportions | 35% |
| Content of cis-1,4 proportions | 26% |
| Content of vinyl groups (1,2 proportions) | 39% |
| Viscosity of the solution at 20° C | 2148 cp. |

216.18 kg of this polybutadiene solution is emulsified with the aid of an emulsifying machine in 216 kg of water in the presence of 0.65 kg of potassium oleate (0.3% by weight, based on the amount of the elastomer solution), 0.0867 kg of a sodium polyacrylate (0.04% by weight, based on the amount of the elastomer solution), 0.0867 kg of a methylcellulose (0.04% by weight, based on the amount of the elastomer solution), and 3.39 kg of a 26% aqueous alkali silicate solution (3% $SiO_2$, based on the amount of the elastomer). The pH value is set at 12.5 by adding sodium hydroxide solution.

1,307.25 kg of the thus-produced, stable aqueous emulsion of the polybutadiene solution is mixed under slight agitation with 1,000 kg of an aqueous ISAF carbon black dispersion, containing 75 kg of ISAF balck and 0.75 kg of potassium oleate (1% by weight, based on the amount of carbon black). In this way, a homogeneous mixture, stable with respect to agitation and storage, is obtained with contains 85 parts by weight of carbon black per 100 parts by weight of elastomer.

This mixture is stirred into an aqueous precipitating bath heated with steam to 90° C., consisting of a mixture, of 300 kg of water and 44.1 kg of a 20% solution of $Al_2(SO_4)_3 \cdot 18 H_2O$. The pH value of the aqueous precipitating bath is about 3.3. While the solvent, hexane, is distilled off, the carbon-black-containing elastomer mixture precipitates in a very finely divided form. After termination of the precipitating step, the pH has dropped to 3.8. The precipitated, pulverulent elastomer-carbon black mixture is separated from the water and dried under constant movement, thus obtaining a highly pourable powder having a long shelf life.

COMPARATIVE EXAMPLE 1

Example 1 is repeated without adding the two organic protective colloids sodium polyacrylate and methylcellulose during the emulsification of the elastomer solution in water.

It is impossible to obtain a stable emulsion during the attempt to emulsify the elastomer solution in water. After the emulsifying device has been shut off, the mixture breaks up into two phases, elastomer solution and water. Such unstable emulsions cannot be processed into powder batches.

COMPARATIVE EXAMPLE 2

Example 1 is repeated without adding the sodium polyacrylate but in the presence of methylcellulose during the emulsification of the elastomer solution in water. Again, no emulsion can be obtained, but rather merely an unstable mixture of solution and water. Such unstable mixtures cannot be converted to powder batches.

COMPARATIVE EXAMPLE 3

Example 1 is repeated without adding methylcellulose, but in the presence of sodium polycarylate during the emulsification of the elastomer solution in water. Although a stable emulsion of the elastomer solution in water is obtained, sediments and coagulates are present after combining the emulsion with the aqueous carbon black dispersion. Such coagulated mixtures cannot be processed to form powder batches.

EXAMPLE 2

The elastomer utilized is a polybutadiene according to Example 1, prepared by adiabatic polymerization of butadiene in the presence of n-butyllithium.

216.18 kg of a 13.6% solution of this elastomer in hexane are emulsified with the aid of an emulsifying machine in 216 kg of water in the presence of 0.65 kg of potassium oleate (0.3% by weight, based on the amount of the elastomer solution), 0.0867 kg of a sodium polyacrylate (0.04% by weight, based on the amount of elastomer solution), 0.0867 kg of a methylcellulose (0.04% by weight, based on the amount of elastomer solution). The pH is set at 11.0–11.5 by adding sodium hydroxide solution.

1,297 kg of the thus-prepared, stable aqueous emulsion of the polybutadiene solution is mixed under slight agitation with 1,000 kg of an aqueous ISAF carbon black dispersion, containing 75 kg of ISAF black, 0.75 kg of laurylamine ethoxylate (1% by weight, based on the amount of carbon black), and 2,646 kg of a 26% sodium silicate solution (2.34% by weight of $SiO_2$, based on the amount of elastomer). In this way, a homogeneous and viscous mixture is obtained which is stable with respect to agitation and storage and contains 85 parts by weight of carbon black per 100 parts by weight of elastomer.

The aforementioned mixture is stirred into a precipitating bath heated by means of steam to 90° C. and consisting of a mixture of 300 kg of water and 8.82 kg of $Al_2(SO_4)_3$. The pH of the precipitating bath is 3.1. While the solvent, hexane, is removed by distillation, the carbon-black-containing elastomer mixture is precipitated in an extremely finely divided form. After termination of the precipitating step, the pH is 3.7.

After precipitation, the aqueous slurry of the carbon-black-containing elastomer mixture is separated from the water and dried under constant motion, thus obtaining a pulverulent, highly pourable elastomer-carbon black mixture.

COMPARATIVE EXAMPLE 4

Example 2 is repeated without adding the two organic protective colloids sodium polyacrylate and methylcellulose during the emulsification of the elastomer solution in water.

It is impossible to obtain a stable emulsion. As soon as the shearing forces of the emulsifying device are no longer effective on the system, the latter breaks up into two phases, elastomer solution and water.

COMPARATIVE EXAMPLE 5

Example 2 is repeated without adding sodium polyacrylate, but in the presence of methylcellulose during the emulsification of the elastomer solution in water.

Again, no stable emulsion is obtained. After the dispersion device has been turned off, the system breaks up into elastomer solution and water.

COMPARATIVE EXAMPLE 6

Example 2 is repeated without adding methylcellulose, but in the presence of sodium polyacrylate during the emulsification of the elastomer solution in water. This time, a very stable and qualitatively satisfactory emulsion is obtained made up of elastomer solution and water.

However, immediately after combining the elastomer solution-emulsion with the aqueous carbon black dispersion, sediments and coagulates are formed. Such coagulated mixtures can no longer be processed into powder batches.

EXAMPLE 3

The elastomer employed is again a polybutadiene according to Example 1, obtained by the adiabatic polymerization of butadiene in the presence of n-butyllithium.

216.18 kg of this polybutadiene solution is dispersed in 216 kg of water with the aid of an emulsifying device in the presence of 0.65 kg of potassium oleate (0.3% by weight, based on the amount of elastomer solution), 0.0867 kg of a sodium polyacrylate (0.04% by weight, based on the amount of elastomer solution), and 0.0867 kg of a methylcellulose (0.04% by weight, based on the amount of elastomer solution). The pH is set at 11.5 by adding sodium hydroxide solution.

1,307.25 kg of the thus-produced, stable aqueous emulsion of the polybutadiene solution is mixed under slight agitation with 1,000 kg of an aqueous ISAF carbon black dispersion containing 75 kg of ISAF carbon black and 0.75 kg of laurylamine ethoxylate (1% by weight, based on the amount of carbon black). In this way, a homogeneous mixture stable with respect to agitation and storage is obtained which contains 85 parts by weight of carbon black per 100 parts by weight of elastomer.

This mixture is stirred into an aqueous precipitating bath heated with steam to 90° C., consisting of a mixture, of 300 kg of water, 0.588 kg of sulfuric acid, and 5.8 kg of a 26% sodium silicate solution (1.5% of $SiO_2$, based on the amount of elastomer). The pH of the aqueous precipitating bath is 2.0. While the solvent, hexane, is removed by distillation, the carbon-black-containing mixture is precipitated in a very finely divided form. After termination of the precipitating step, the pH has dropped to 2.9. The pH is then adjusted to 6.8 by adding sodium hydroxide solution. Thereafter, the precipitated, pulverulent elastomer-carbon black mixture is separated from the water and dried under constant movement, thus obtaining a highly pourable powder having a stable shelf life.

COMPARATIVE EXAMPLE 7

Example 3 is repeated without adding the two organic colloids sodium polyacrylate and methylcellulose during the emulsification of the elastomer solution in water.

No stable emulsion is obtained. After the emulsifying step is stopped, the system immediately breaks up into elastomer solution and water, and two phases are formed.

COMPARATIVE EXAMPLE 8

Example 3 is repeated without adding sodium polyacrylate, but with the addition of methylcellulose during the emulsification of the elastomer solution in water.

Again, it is impossible to obtain a stable emulsion.

COMPARATIVE EXAMPLE 9

Example 3 is repeated without adding methylcellulose, but with the addition of sodium polyacrylate during the emulsification of the elastomer solution in water.

An emulsion is obtained having high stability and quality. However, the mixture of this stable emulsion and the aqueous carbon black dispersion is unstable. Immediately after combining the two disperse systems, precipitations and coagulates occur. Such coagulated mixtures cannot be processed to powder batches.

EXAMPLE 4

The elastomer employed is a copolymer produced by solution polymerization of butadiene and styrene in the presence of n-butyllithium as the catalyst, in the form of a 14% solution in hexane. The copolymer has the following analytical data:

| | |
|---|---|
| Mooney viscosity (ML-4) | 76 |
| Styrene content | 20% |
| Butadiene content | 80% |
| Gel content | 2% |
| trans-1,4 Proportions | 37% |
| cis-1,4 Proportions | 34% |
| Vinyl groups (1,2 proportions) | 9 |
| Block styrene content | 3.2% |
| Solution viscosity | 4490 cp. |

225 kg of this elastomer solution is emulsified in 225 kg of water with the aid of an emulsifying device in the presence of 0.045 kg of potassium oleate (0.2% by weight, based on the amount of elastomer solution), 0.0045 kg of sodium polyacrylate (0.02% by weight, based on the amount of elastomer solution), and 0.00225 kg of a methylcellulose (0.001% by weight, based on the amount of elastomer solution). The pH value is set to 11.5 by adding sodium hydroxide solution.

This stable, aqueous emulsion of the elastomer solution is mixed under simple agitation with 294 kg of an aqueous IASF carbon black dispersion containing 30 kg of ISAF black and 0.03 kg of potassium oleate (1% by weight, based on the amount of carbon black). In this way, a stable, homogeneous aqueous mixture is obtained from the emulsion of the elastomer solution and the carbon black dispersion. The mixture contains 70 parts of "Corax 6" per 100 parts of elastomer.

The stable, homogeneous and aqueous mixture of the emulsion of the rubber solution and the carbon black dispersion is stirred into an aqueous precipitating bath heated with steam to 90° C. and consisting of a mixture of 250 kg of water, 0.0012 kg of sodium silicate solution (0.001% by weight of $SiO_2$, based on the elastomer), and 3.5 kg of $Al_2(SO_4)_3 \cdot 18\ H_2O$. While the solvent, hexane, is removed by distillation, the elastomer-carbon black mixture is precipitated in finely divided form. The pH of the aqueous phase during the precipitating step is between 3.2 and 3.8.

After termination of the precipitating process and after driving off the hexane, the pH of the aqueous phase is set at 4.0–7.0 by adding sodium hydroxide solution.

After separation of the pulverulent elastomer-carbon black mixture from the water and drying under constant motion, a pourable powder is obtained.

COMPARATIVE EXAMPLE 10

Example 4 is repeated without adding the sodium polyacrylate during the emulsification of the elastomer solution in water. It is impossible to obtain a stable emulsion from the elastomer solution and the water. Such unstable emulsions or mixtures cannot be processed into powder batches.

EXAMPLE 5

The elastomer employed is a polybutadiene according to Example 1, obtained by adiabatic polymerization of butadiene in the presence of n-butyllithium.

The emulsifier for emulsifying the elastomer solution in water is a commercially available mixture of the alkali metal salts of $C_{14}$- to $C_{18}$-fatty acids. The fatty acid mixture has the following composition:

| Saturated Fatty Acids | | Unsaturated Fatty Acids |
|---|---|---|
| 3% | $C_{14}$ | 3% $C_{16}$ with 1 double bond |
| 28% | $C_{16}$ | 37% $C_{18}$ with 1 double bond |
| 27% | $C_{18}$ | 2% $C_{18}$ with 2 double bonds |

All numbers represent percents by weight. The iodine number of the mixture ranges between 40 and 70.

216.18 kg of the polybutadiene solution described in Example 1 is emulsified in 216 kg of water with the aid of an emulsifying machine in the presence of 0.65 kg of the aforementioned fatty acid mixture (0.3% by weight, based on the amount of elastomer solution), 0.0867 kg of a sodium polyacrylate (0.04% by weight, based on the amount of elastomer solution), and 0.0867 kg of a methylcellulose (0.04% by weight, based on the amount of elastomer solution). The pH value is adjusted to about 11.0 by adding sodium hydroxide solution.

1,307.25 kg of the thus-produced, stable aqueous emulsion of the polybutadiene solution is mixed under slight agitation with 1,000 kg of an aqueous ISAF black dispersion containing 75 kg of ISAF black and 0.75 kg of a laurylamine ethoxylate (1% by weight, based on the amount of carbon black) and 5.1 kg of a 26% sodium silicate solution (1.5% of $SiO_2$, based on the amount of elastomer). In this way, a homogeneous mixture stable against agitation and storage is obtained which contains 85 parts by weight of carbon black per 100 parts by weight of elatomer.

This mixture is stirred into an aqueous precipiatating bath, the pH of which is 1.8 and which consists of a mixture, heated with steam to 90° C., of 300 kg of water, 5.1 kg of a 26% sodium silicate solution (1.5% of $SiO_2$, based on the amount of elastomer), and 0.88 kg of sulfuric acid. While the solvent, hexane, is distilled off, the carbon-black-containing elastomer mixture is precipitated in a very finely divided form. After the precipitation step is terminated, the pH is adjusted to 5.3 with the aid of sodium hydroxide solution. The thus-precipitated, pulverulent elastomer-carbon black mixture is separated from the water and dried under constant agitation, thus obtaining a powder which is pourable and has a long shelf life.

COMPARATIVE EXAMPLE 11

Example 5 is repeated without adding the two organic protective colloids, sodium polyacrylate and methylcellulose, during the emulsification of the elastomer solution in water.

No stable emulsion is obtained when emusifying the elastomer solution in water. After the emulsifier device is turned off, the mixture breaks up into two phases, elastomer solution and water. Such unstable emulsions cannot be processed into powder batches.

COMPARATIVE EXAMPLE 12

Example 15 is repeated without adding sodium polyacrylate, but in the presence of methylcellulose during the emulsification of the elastomer solution in water. Again, it is impossible to obtain an emulsion; rather, an unstable mixture of solution and water is formed. Such unstable mixtures cannot be converted to powder batches.

COMPARATIVE EXAMPLE 13

Example 5 is repeated without the addition of methylcellulose, but in the presence of sodium polyacrylate during the emulsification of the elastomer solution in water. Although a stable emulsion of the elastomer solution in water is obtained, sediments and coagulates appear after combining the emulsion with the aqueous carbon black disperison. Such coagulated mixtures cannot be processed into powder batches.

EXAMPLE 6

224.43 kg of a 13.1% solution of the elastomer described in Example 1 is emulsified in 200 kg of water with the aid of an emulsifying device in the presence of 0.67 kg of the fatty acid mixture disclosed in Example 5 (0.3%, based on the amount of elastomer solution), 0.0896 kg of a sodium polyacrylate (0.04% by weight, based on the amount of elastomer solution), and 0.0896 kg of a methylcellulose (0.04% by weight, based on the amount of elastomer solution). The pH is set at 11.2 with the aid of sodium hydroxide solution.

1,346.58 kg of the thus-produced, stable aqueous emulsion of the polybutadiene solution is mixed under slight agitation with 1,000 kg of an aqueous ISAF carbon black dispersion containing 75 kg of ISAF black and 0.75 kg of a laurylamine ethoxylate (1% by weight, based on the amount of carbon black). In this way, a homogeneous mixture stable with respect to agitation and storage is obtained which contains 85 parts by weight of carbon black per 100 parts by weight of elastomer.

This mixture is stirred into an aqueous precipitating bath, the pH of which is 1.1 and which consists of a mixture, heated with steam to 90° C., of 300 kg of water, 5.09 kg of a 26% sodium silicate solution (1.5% by weight of $SiO_2$, based on the amount of elastomer), and 1.794 kg of sulfuric acid. While the solvent, hexane, is distilled off, the carbon-black-containing elastomer mixture is precipitated in a very finely divided form. After termination of the precipitating step, the pH is set to 6.0 with the aid of sodium hydroxide solution. The thus-precipitated pulverulent elastomer-carbon black mixture is separated from the water and dried under constant motion, thus obtaining a well pourable and storable powder.

COMPARATIVE EXAMPLE 14

Example 6 is repeated, using during he emulsification of the elastomer solution, merely the fatty acid mixture without the two organic protective colloids, sodium polyacrylate and methylcellulose.

During the emulsification of the elastomer solution in water, no stable emulsion is produced this time. After shut-off of the emulsifying device, the mixture breaks up into elastomer solution and water, forming two phases. Such unstable emulsions of mixtures cannot be processed into powder batches.

COMPARATIVE EXAMPLE 15

The emulsification according to Example 6 is conducted without adding the sodium polyacrylate, but in the presence of the fatty acid mixture and methylcellulose. Again, it is impossible to obtain a stable emulsion; rather, there is produced merely an unstable mixture of solution and water. Such unstable mixtures cannot be made into powder batches.

COMPARATIVE EXAMPLE 16

The emulsification according to Example 6 is conducted this time without the addition of methylcellulose, but in the presence of the fatty acid mixture and sodium polyacrylate. Although a stable emulsion of the elastomer solution in water is obtained, there are sediments and coagulates present after combining this stable emulsion with the aqueous carbon black dispersion. Such coagulated mixtures cannot be used for the production of powder batches.

EXAMPLE 7

250 kg of a 12.9% elastomer solution of the polybutadiene described in Example 1 is emulsified in 250 kg of water with the aid of an emulsifying machine in the presence of 1 kg of a commerical fatty acid mixture (0.4% by weight, based on the amount of the elastomer solution) in the form of the alkali salt, 0.0125 kg of a sodium polyacrylate (0.005% by weight, based on the amount of elastomer solution), and 0.075 kg of a methylcellulose (0.03% by weight, based on the amount of elastomer solution). The pH is set at 11.3 by adding sodium hydroxide solution.

The commercial fatty acid mixture has the following composition:

| Proportion of Saturated Fatty Acids |
|---|
| 2% by weight of a $C_{14}$-fatty acid |
| 23% by weight of a $C_{16}$-fatty acid |
| 18% by weight of a $C_{18}$-fatty acid |
| Proportion of Unsaturated Fatty Acids |
| 5% by weight of $C_{16}$-fatty acids with 1 double bond |
| 46% by weight of $C_{18}$-fatty acids with 1 double bond |
| 5% by weight of $C_{18}$-fatty acids with 2 double bonds |
| 1% by weight of $C_{18}$-fatty acids with 3 double bonds |

The iodine number of the mixture ranges between 25 and 60.

1,000 kg of the thus-prepared, stable aqueous emulsion of the polybutadiene solution is mixed under slight agitation with 1,104 kg of a 5% aqueous ISAF carbon black dispersion, produced in the presence of 0.55 kg of a laurylamine ethoxylate, thus obtaining a homogeneous mixture which is stable with respect to agitation and storage.

This mixture is stirred into an aqueous precipitating bath, the pH of which is 1.4 and which consists of a mixture, steam-heated to 90° C., of 200 kg of water, 3.75 kg of a 26% sodium silicate solution (0.975 kg of $SiO_2$ = 1.5% $SiO_2$, based on the amount of elastomer), and 1.3 kg of sulfuric acid. While the solvent, hexane, is distilled off, the carbon-black containing elastomer mixture precipitates in a very finely divided form. After termination of the precipitating process, the pH of the slurry is set to 6.5 by means of sodium hydroxide solution.

COMPARATIVE EXAMPLE 17

The emulsification is conducted analogously to Example 7, but without the two organic protective colloids sodium polyacrylate and methylcellulose and exclusively in the presence of the fatty acid mixture. It is impossible to obtain a stable emulsion of elastomer solution in water. After the emulsifying device has been turned off, the mixture breaks up into elastomer solution and water, the two components forming two separate phases. Such unstable emulsions or mixtures cannot be processed into powder batches.

COMPARATIVE EXAMPLE 18

The emulsifying process is conducted according to Example 7, but without the addition of sodium acrylate, while adding the fatty acid mixture and methylcellulose. Again, no stable emulsion is obtained, but rather merely an unstable mixture of solution and water. Such unstable mixtures cannot be processed to obtain powder batches.

COMPARATIVE EXAMPLE 19

The emulsification of the elastomer solution in water as described in Example 7 is again conducted, but without adding methylcellulose, whereas the fatty acid mixture and sodium polyacrylate are utilized. Although a stable emulsion of the elastomer solution in water is obtained, after this stable emulsion has been combined with the aqueous carbon black dispersion, sediments and coagulates are are present. Such pre-coagulated mixtures can no longer be processed into powder batches.

EXAMPLE 8

(a) Dispersion of the Elastomer Solution 300 kg of a 12.8% elastomer solution of the polybutadiene described in Example 1 is emulsified in 300 kg of water with the aid of an emulsifying device in the presence of 1.2 kg of potassium oleate (0.4% by weight, based on the amount of elastomer solution), 0.09 kg of a methylcellulose (0.03% by weight, based on the amount of elastomer solution), and 0.015 kg of a sodium polyacrylate (0.005% by weight, based on the amount of elastomer solution). The pH is adjusted to 12.5 by adding sodium hydroxide solution.

(b) Dispersion of the Carbon Black 140 kg of an ISAF carbon black is dispersed in 2,786 kg of water in the presence of 0.28 kg of an alkyl amine ethoxylate (0.2% by weight, based on the amount of carbon black) and 1.12 kg of an alkyl phenol polyglycol ether (0.8% by weight, based on the amount of carbon black).

(c) Preparation of a Mixture from (a) to (b)

1,094 kg of an emulsion of the elastomer solution in water prepared according to (a) and 1,190 kg of an aqueous carbon black dispersion (85 parts of carbon black per 100 parts of elastomer) prepared according to (b) are intimately mixed together. The mixture is stable and homogeneous.

(d) Precipitation of the Powder Batch

The mixture prepared according to (c) is stirred into an aqueous precipitating bath consisting of a mixture, heated by steam to 90° C., of 950 kg of water, 4.2 kg of sulfuric acid (3 parts per 100 parts of elastomer), and 8.06 kg of a 26% sodium silicate solution (1.5 parts of $SiO_2$ per 100 parts of elastomer). While the solvent, hexane, is distilled off, the carbon-black-containing elastomer mixture is precipitated in a very finely divided form. The pH has dropped from 1.9 to 3.0. By the addition of sodium hydroxide solution, the pH is set at 7.0 after the coagulation is finished.

The thus-precipitated pulverulent elastomer-carbon black mixture is separated from the water and dried under constant agitation, thus obtaining a highly pourable and storable powder.

COMPARATIVE EXAMPLE 20

The emulsification is carried out analogously to Example 8 but without the addition of the two organic protective colloids alkali polyacrylate and methylcellulose and exclusively in the presence of the potassium oleate component. The result is not a stable emulsion of the elastomer solution in water. Under these conditions, the production of a powder batch is impossible.

COMPARATIVE EXAMPLE 21

The elastomer solution is emulsified in water, again in accordance with Example 8 but without the addition of the alkali polyacrylate. Again, there is no stable emulsion, but merely an unstable mixture of solution and water. Such unstable mixtures cannot be made into powder batches.

COMPARATIVE EXAMPLE 22

The emulsification of the elastomer solution in water again takes place analogously to Example 8, but without the addition of methylcellulose. In this case, a stable emulsion of elastomer solution in water is obtained, but after this stable emulsion is combined with the aqueous carbon black dispersion, sediments and coagulates appear. Such pre-coagulated mixtures can no longer be processed into powder batches.

EXAMPLE 9

Example 8 is repeated. However, in place of the potassium oleate, a fatty acid mixture is used, as described in Example 7, in the form of the alkali salts. The elastomer solution can be readily converted into a carbon-black-containing powder batch.

EXAMPLE 10

261.45 kg of a 13.1% solution of the elastomer described in Example 1 is emulsified in 224 kg of water with the aid of an emulsifying device in the presence of 0.523 kg of potassium oleate (0.2% by weight, based on the amount of elastomer solution), 0.1046 kg of a a sodium polyacrylate (0.04% by weight, based on the amount of elastomer solution), 0.1046 kg of a methylcellulose (0.04% by weight, based on the amount of elastomer solution). The pH is set at 11.5 with the aid of potassium hydroxide solution.

1,568.7 kg of the thus-prepared, stable aqueous emulsion of the polybutadiene solution is mixed under slight agitation with 1,000 kg of an aqueous ISAF carbon black dispersion containing 75 kg of ISAF carbon black (70 pphr) and 0.75 kg of laurylamine ethoxylate (1% by weight, based on the amount of carbon black). A homogeneous mixture, stable with respect to agitation and storage, is thus obtained, the pH value of which is set at 11.5 by adding potassium hydroxide solution.

This mixture is stirred into an aqueous precipitating bath, the pH of which is 1.5 and which consists of a mixture steam-heated to 90° C., of 300 kg of water, 3.08 kg of sulfuric acid (3 pphr), and 9.881 kg of a 26% sodium silicate solution (2.569 kg $SiO_2$ = 2.5 pphr).

While the solvent, hexane, is removed by distillation, the carbon-black-containing elastomer mixture is precipitated in a very finely divided form. After termination of the precipitating step, the pH is set at 6.5 by adding sodium hydroxide solution.

The precipitated, pulverulent elastomer-carbon black mixture is separated from the water and dried under constant agitation, thus obtaining a pourable powder.

COMPARATIVE EXAMPLE 23

The emulsification of the elastomer solution is conducted according to Example 10 but without the addition of the two organic protective colloids sodium polyacrylate and methylcellulose, using exclusively potassium oleate. In this way, it is impossible to obtain a stable emulsion of the elastomer solution in water. After the emulsifying device has been shut off, the mixture breaks up into elastomer solution and water, the two components forming separate phases. Such unstable emulsions or mixtures cannot be processed into powder batches.

COMPARATIVE EXAMPLE 24

The emulsifying process according to Example 10 is conducted without the addition of a sodium polyacrylate, but in the presence of potassium oleate and methylcellulose. Again, it is impossible to obtain a stable emulsion; the product is an unstable mixture of solution and water. Such unstable mixtures cannot be converted to powder batches.

COMPARATIVE EXAMPLE 25

The emulsification of the elastomer solution in water is conducted according to Example 8, but without the addition of methylcellulose, while using potassium oleate and sodium polyacrylate. Although a stable emulsion of elastomer solution in water is obtained, once this stable emulsion is combined with the aqueous carbon black dispersion sediments and coagulates appear. Such pre-coagulated mixtures can no longer be made into powder batches.

EXAMPLE 11

The elastomer solution was prepared analogously to Example 10. The carbon black dispersion was produced analogously to Example 10, with the variation that the emulsifiers employed were, in place of laurylamine ethoxylate, 0.6 kg of an alkyl phenol oxyethylate (0.8% by weight, based on the amount of carbon black), and 0.225 kg of potassium oleate (0.3% by weight, based on the amount of carbon black). The mixtures of the emulsion of the elastomer solution and the carbon black dispersion are worked up in accordance with Example 10. The precipitated pulverulent elastomer-carbon black mixture is separated from the water and dried under constant agitation, thus obtaining a pourable powder.

COMPARATIVE EXAMPLE 26

The elastomer employed is a polybutadiene obtained by the adiabatic polymerization of butadiene in the presence of n-butyllithium, in the form of its 13.6% by weight solution in hexane. The polybutadiene has the following analytical

| | |
|---|---|
| Mooney viscosity (ML-4) | 80 |
| Defo | 1150/34 |
| Gel content | <2% |
| Content of trans-1,4 proportions | 35% |
| Content of cis-1,4 proportions) | 26% |
| Vinyl group content (1,2 proportions) | 39% |
| Viscosity of the solution at 20° C | 2148% |

216.18 kg of this polybutadiene solution is emulsified in 216 kg of water with the aid of an emulsifying device in the presence of 1.3 kg of a laurylamine ethoxylate with 12 ethoxy units (0.6% by weight, based on the amount of elastomer solution) and 3.39 kg of a 26% aqueous alkali silicate solution (3% of $SiO_2$, based on the amount of elastomer). The pH is adjusted to 12.5 by the addition of sodium hydroxide solution.

1,307.25 kg of the thus-prepared, stable aqueous emulsion of the polybutadiene solution is mixed under slight agitation with 1,000 kg of an aqueous ISAF carbon black dispersion containing 75 kg of ISAF carbon black and 0.75 kg of potassium oleate (1% by weight, based on the amount of carbon black). In this way, a homogeneous mixture, stable with respect to agitation and storage, is obtained which contains 85 parts by weight of carbon black per 100 parts by weight of elastomer.

This mixture is stirred into an aqueous precipitating bath consisting of a mixture, steam-heated to 90° C., of 300 kg of water, 0.588 kg of sulfuric acid, and 5.8 kg of a 26% sodium silicate solution (1.5% $SiO_2$, based on the amount of elastomer). The pH of the aqueous precipitating bath is 2.0. While the solvent, hexane, is distilled off, the carbon-black-containing elastomer mixture is precipitated in a very finely divided form. After termination of the precipitating step, the pH has dropped to 2.9 and is now adjusted to 6.8 by adding sodium hydroxide solution. Thereafter, the precipitated pulverulent elastomer-carbon black mixture is separated from the water and dried under constant motion. A pulverulent elastomer-carbon black mixture is thus obtained.

EXAMPLE 12

The pulverulent basic elastomer mixtures obtained according to Example 1 and Comparative Example 26 are compared with respect to their characteristics in practical use. The most important characteristic data are as follows:

| | Product of Example 1 | Product of Comparative Example 26 |
|---|---|---|
| Average particle diameter (μm) | 240 | 350 |
| DBP Absorption (ml/100 g) | 82 | 61 |
| Maximum plasticizer absorption (parts by weight) (*) | 120 | 90 |

DBP = di-butyl-phthalate
(*) Determined in a fluid mixer by adding a mineral oil plasticizer customarily employed in elastomers until the particles stick to one another and thus the powder phase is abolished. Data in parts by weight per 100 parts of the elastomer contained in the basic mixture.

From these pulverulent basic mixtures, a finished mixture of the following composition is produced in a 200-liter fluid mixer of the Henschel type:

| Component | Parts By Weight |
|---|---|
| Basic elastomer powder mixture | 185 |
| Aromatic plasticizer oil ("Naftolen MV") | 50 |
| Stearic acid | 2.5 |
| Zinc oxide | 4.0 |

-continued

| Component | Parts By Weight |
|---|---|
| Coumarone resin | 2.5 |
| Sulfur | 2.0 |
| "Vulkacit CZ" | 1.0 |

With a speed of 650 r.p.m., the following mixing sequence is observed:

| Basic elastomer powder mixture | added | 0–5 sec. |
|---|---|---|
| Plasticizer oil | added | 5–105 sec. |
| Other chemicals | added | 105–120 sec. |
| Secondary mixing step | | 120–150 sec. |

The weight of the batch is 40 kg. The temperature of the mixed material is 35°–45° C.

Properties of the finished mixtures:

| | Bulk Density g/l | Pourability Test (*) |
|---|---|---|
| Product According to Example 1 | 0.38 | 25.8 sec. |
| Product According to Comparative Example 26 | 0.35 | 24.9 sec. |

(*) Determined according to the efflux time method per ASTM-D 1895-69. Amount of mixture: 100 g; opening angle of funnel: 40° opening diameter 10 mm.

The thus-obtained finished mixtures are fed in this form directly to a special extruder of the "EVK 90" type by Werner & Pfleiderer Company. At a screw speed of 80 r.p.m., a jacket temperature of 40° C., and a head temperature of 95° C., about 220 kg of extrudate is obtained in both cases, in the form of a motorcycle tire tread.

The properties of the vulcanizate (vulcanization at 150° C. for 30 minutes) are tested as compared with the properties of a mixture of the same composition, prepared according to conventional methods from solid rubber (vulcanization at 150° C. for 30 minutes), showing the following results:

| | Comparison Mixture of Solid Rubber | Mixture of Product of Example 1 | Mixture of Product of Comparative Example 2 |
|---|---|---|---|
| Mixture viscosity ML-4 | 68 | 70 | 71 |
| Monsanto Rheometer 150° C $t_{10}$ | 8.0 min. | 8.2 min. | 5.2 min. |
| $t_{90}$ | 14.2 min. | 14.5 min. | 10.5 min. |
| Tensile strength (MPa) | 14.5 | 14.9 | 14.3 |
| Elongation at repture (%) | 528 | 515 | 525 |
| Modulus 300% (MPa) | 7.2 | 7.6 | 7.7 |
| Hardness (Shore A) | 61 | 62 | 63 |
| Elasticity 20° C (%) | 32 | 33 | 33 |
| Tire test, abrasion index after 12,000 km | 100 | 100 | 101 |

EXAMPLE 13

The pulverulent basic elastomer mixtures prepared according to Example 6 and Comparative Example 26 are compared with respect to their behavior in practical use. The most important characteristic data are as follows:

| | Product of Example 6 | Product of Comparative Example 26 |
|---|---|---|
| Average particle diameter (μm) | 210 | 350 |
| DBP Absorption (ml/100 g) | 86 | 61 |
| Maximum plasticizer absorption (parts by weight)(*) | 128 | 90 |

(*)Determined in a fluid mixer (see Example 12).

From these pulverulent basic elastomer mixtures, a finished mixture is prepared in a fluid mixer of the Henschel type, having the following composition:

| Component | Parts By Weight |
|---|---|
| Basic elastomer powder mixture | 185 |
| Aromatic plasticizer oil ("Naftolen MV") | 60 |
| Stearic acid | 2.5 |
| Zinc oxide | 4.0 |
| Coumarone resin | 2.5 |
| Sulfur | 2.2 |
| "Vulkacit CZ" | 1.1 |

At a speed of 650 r.p.m., the following mixing sequence evolves:

| Basic elastomer powder mixture | added | 0 – 5 sec. |
|---|---|---|
| Plasticizer oil | added | 5 – 120 sec. |
| Other chemicals | added | 120 – 135 sec. |
| Secondary mixing step | | 135 – 170 sec. |

The weight of the batch is 40 kg. The temperature of the mixed material is 35°–45° C.

Properties of the finished mixture:

| | Bulk Density g/l | Pourability Test (*) |
|---|---|---|
| Product of Example 6 | 0.4 | 24.7 sec. |
| Product of Comparative Example 26 | 0.4 | 24.5 sec. |

(*)Determined according to ASTM-D 1895-69 (see Example 12).

The thus-obtained finished mixtures are introduced in this form directly to a rolling mill having the dimensions of 550 × 1500 mm. The rolling sheet is formed spontaneously. After a running period of 4 minutes, lining strips are taken off the rolling mill at a temperature of about 70° C. and fed to a tire tread extruder having a screw length of 6 d and a diameter of 250 mm. The jacket temperature is 40° C., the head temperature is 90° C. and the screw speed is 32 r.p.m. Included in this comparison is a finished mixture of the same composition prepared according to conventional methods from solid rubber (bales) (vulcanization at 150° C. for 30 minutes).

| | Comparison Mixture of Solid Rubber | Mixture of Product of Example 6 | Mixture of Product of Comparative Example 26 |
|---|---|---|---|
| Ejection output kg/min. | 42.1 | 43.2 | 42.5 |
| Ejection Temperature ° C | 108 | 110 | 110 |
| Viscosity ML-4 | 58 | 60 | 61 |
| Monsanto Rheometer 150° C $t_{10}$ | 7.9 | 8.1 | 5.0 |

| | | Comparison Mixture of Solid Rubber | Mixture of Product of Example 6 | Mixture of Product of Comparative Example 26 |
|---|---|---|---|---|
| | $t_{90}$ | 14.5 | 14.2 | 10.8 |
| Tensile strength (MPa) | | 13.3 | 13.6 | 12.8 |
| Elongation at rupture (%) | | 550 | 531 | 528 |
| Modulus 300% (MPa) | | 7.0 | 7.5 | 7.6 |
| Hardness (Shore A) | | 59 | 61 | 61 |
| Elasticity 20° C (%) | | 31 | 31 | 31 |
| Tire test, abrasion index after 12,000 km | | 100 | 100 | 99 |

EXAMPLE 14

The pulverulent basic elastomer mixtures obtained according to Example 7 and Comparative Example 26 are compared regarding their use characteristics under practical conditions. The most important characteristic data are as follows:

| | Product of Example 7 | Product of Comparative Example 26 |
|---|---|---|
| Average particle diameter (μm) | 200 | 350 |
| DBP Absorption (ml/100 g) | 88 | 61 |
| Maximum plasticizer absorption (parts by weight)(*) | 134 | 90 |

(*)Determined in a fluid mixed (see Examples 12 and 13).

From this basic elastomer powder mixture, a finished mixture is prepared in an internal mixer of the "GK 160" type on the basis of the following recipe in a single operating step:

| Component | Parts by Weight |
|---|---|
| Basis elastomer powder mixture | 185 |
| Aromatic plasticizer oil ("Naftolen NV") | 50 |
| Stearic acid | 2.5 |
| Zinc Oxide | 4.0 |
| Coumarone resin | 2.5 |
| Sulfur | 2.0 |
| "Vulkacit CZ" | 1.0 |

At a rotor speed of 40 r.p.m. and a chamber temperature of 50° C., a mixture step is performed according to the model of the "upside down" process, i.e. all mixture components are introduced directly at the beginning of the operation in the sequence of plasticizer, then basic elastomer powder mixture and then chemicals. The mixing material reaches a temperature of 108° C. after 45 seconds and is ejected at this point in time as a compact finished mixture which displays neither chalking nor crumbling. After the product has been introduced into a rolling mill, a smooth, flawlessly revolving sheet is obtained. The thus-obtained mixture is extruded analogously to Example 13 into tire treads. Included in this comparison in the preparation of a mixture having the same composition starting with solid rubber in bale form (vulcanization at 150° C. for 30 minutes). The results of the experiment are as follows:

| | Comparison Mixture of Solid Rubber in Bale Form | Mixture of Product of Example 7 | Mixture of Product of Comparative Example 26 |
|---|---|---|---|
| Mixing time first stage | 120 sec. | | |
| Ejection temperature | 160° C | Eliminated | Eliminated |
| Energy kwh/kg | 0.13 | | |
| Mixing time second stage | 75 sec. | 45 sec. | 45 sec. |
| Ejection temperature °C | 110 | 108 | 108 |
| Energy kwh/kg | 0.07 | 0.06 | 0.06 |
| Mixture viscosity Monsanto Rheometer 150° C | 67 | 67 | 69 |
| $t_{10}$ | 8.1 | 8.3 | 5.3 |
| $t_{90}$ | 14.6 | 14.6 | 10.4 |
| Tensile strength (MPa) | 13.9 | 14.1 | 13.9 |
| Elongation at rupture (%) | 541 | 530 | 535 |
| Modulus 300% (MPa) | 6.9 | 7.1 | 7.3 |
| Hardness (Shore A) | 61 | 62 | 63 |
| Elasticity 20° C (%) | 32 | 33 | 33 |
| Tire test, abrasion index after 12,000 km | 100 | 100 | 100 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the production of pulverulent, pourable elastomer-filler mixtures, optionally containing plasticizer oil, by mixing an aqueous emulsion of an elastomer solution with an aqueous dispersion of filler; introducing this mixture into water containing a precipitant; precipitating the elastomer-filler mixture while simultaneously removing the elastomer solvent by distillation; separating the thus-precipitated elastomer-filler mixture from the water; and drying the elastomer mixture under continuous agitation;

the improvement which comprises: emulsifying the elastomer solution in water in the presence of:
 (a) 0.01–1.0% by weight of an anionic emulsifier, based on the amount of the elastomer solution;
 (b) 0.001–0.1% by weight of an ionic protective colloid, based on the amount of the elastomer solution; and
 (c) 0.001–0.1% by weight of a nonionic protective colloid, based on the amount of the elastomer solution;

combining the thus-stabilized solution-emulsion with an aqueous dispersion of filler, said dispersion having a pH of > 7, and containing 0.01–5% by weight, based on the amount of filler, of a tenside or a mixture of tensides, which when combined with components (a)

through (c) of the elastomer emulsion do not result in a reduction of the surface activity of either the components (a) through (c) or the tensides, to obtain a homogeneous mixture stable with respect to storage and agitation; and introducing this mixture into a precipitating bath, the pH of which is set at 1.0–5.0 by the addition of precipitants selected from acids, metallic salts subject to acidic hydrolysis in water and mixtures thereof, the temperature of which is above the azeotropic boiling point of the elastomer solvent and water, and which contains an amount of sodium silicate, based on the total elastomer content, such that, at the pH values of the precipitating bath, 0.001–20% by eight of colloidally dissolved silicic acid is produced therefrom.

2. The improvement of claim 1, wherein the elastomer solution is a solution of polybutadiene, a polyisoprene, copolymers of butadiene and styrene, EPM or EPDM polymers produced of solution polymerization, polyalkenamers produced by the ring-opening polymerization of cycloolefins or mixtures thereof.

3. The improvement of claim 2 wherein the elastomer solution is a solution of a polybutadiene or a copolymer of butadiene and styrene dissolved in an aliphatic solvent.

4. The improvement of claim 3, wherein the elastomer solution is a solution of polybutadiene or a copolymer of butadiene and styrene each having a vinyl group content of 10–70%.

5. The improvement of claim 4, wherein the elastomer solution is a solution of a polybutadiene or a copolymer of butadiene and styrene each having a vinyl group content of 20–60%.

6. The improvement of claim 1, wherein the anionic emulsifier (a) is present in the elastomer emulsion in an amount of 0.05–0.5% by weight, based on the amount of the elastomer solution.

7. The improvement of claim 1, wherein the anionic emulsifier (a) is an alkali metal salt of saturated or unsaturated $C_{12}$- to $C_{18}$-fatty acids or aromatic sulfonic acids.

8. The improvement of claim 1, wherein the ionic protective colloid (b) is present in the elastomer emulsion in an amount of 0.004–0.05% by weight, based on the amount of the elastomer solution.

9. The improvement of claim 1, wherein the ionic protective colloid (b) is a sodium polyacrylate.

10. The improvement of claim 9, wherein the sodium polyacrylate has a molecular weight of 100,000–2,000,000.

11. The improvement of claim 10, wherein the sodium polyacrylate has a molecular weight of 250,000–1,500,000.

12. The improvement of claim 1, wherein the nonionic protective colloid (c) is present in the elastomer emulsion in an amount of 0.004–0.05% by weight, based on the amount of the elastomer solution.

13. The improvement of claim 1, wherein the nonionic protective colloid (c) is a cellulose derivative.

14. The improvement of claim 13, wherein the nonionic protective colloid (c) is methylcellulose, carboxymethylcellulose, or a Tylose.

15. The improvement of claim 1, wherein the filler is carbon black, a mineral filler or a mixture thereof.

16. The improvement of claim 15, wherein the mineral filler is highly active silicic acid, kaolin, or ground slate.

17. The improvement of claim 15 wherein the amount of mineral filler in the mixture of elastomer emulsion and filler dispersion is between 20% by weight based on the weight of elastomer and 500 parts by weight per 100 parts by weight of elastomer.

18. The improvement of claim 17, wherein the amount of mineral filler in the mixture of elastomer emulsion and filler dispersion is between 30% by weight based on the weight of elastomer and 150 parts by weight per 100 parts by weight of elastomer.

19. The improvement of claim 1, wherein the amount of carbon black in the mixture of elastomer emulsion and filler dispersion is 20% by weight based on the weight of the elastomer to 400 parts by weight per 100 parts by weight of elastomer.

20. The improvement of claim 19, wherein the amount of carbon black in the mixture of elastomer emulsion and filler dispersion is 40% by weight based on the weight of the elastomer to 110 parts by weight per 100 parts by weight of elastomer.

21. The improvement of claim 1, wherein the filler dispersion contains 0.01–5% by weight, of tenside based on the quantity of filler.

22. The improvement of claim 1, wherein the precipitant is a water-soluble salt of a metal of Main Groups II or III, or Subgroups II or VIII of the Periodic Table of the Elements.

23. The improvement of claim 22, wherein a water-soluble aluminum salt is employed as the precipitant.

24. The improvement of claim 1, wherein the amount of silicic acid introduced into the precipitating bath by addition of sodium silicate is 1–10% by weight, based on the total amount of elastomer.

25. The improved process of claim 1, which further comprises adjusting the pH of the precipitating bath ot 5–9 after the precipitation of the elastomer-filler mixture and before the separation thereof.

26. The pulverulent, pourable elastomer-filler mixture prepared by the improved process of claim 1.

27. A method of preparing shaped rubber articles which comprises preparing a blend of elastomer and filler by the process of claim 1 and molding or extruding the blend.

28. A method of preparing shaped rubber articles which comprises shaping the pulverulent, pourable elastomer-filler mixture of claim 26.

* * * * *